United States Patent
Breault et al.

(10) Patent No.: US 12,448,901 B1
(45) Date of Patent: Oct. 21, 2025

(54) THERMAL MANAGEMENT SYSTEM FOR GAS TURBINE ENGINE WITH OPEN PROPULSOR

(71) Applicant: RTX Corporation, Farmington, CT (US)

(72) Inventors: Andrew E. Breault, Bolton, CT (US); Murat Yazici, Glastonbury, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/731,047

(22) Filed: May 31, 2024

(51) Int. Cl.
| | |
|---|---|
| F01D 25/12 | (2006.01) |
| F01D 9/06 | (2006.01) |
| F01D 17/16 | (2006.01) |
| F01D 25/02 | (2006.01) |

(52) U.S. Cl.
CPC ............. F01D 25/12 (2013.01); F01D 9/065 (2013.01); F01D 17/16 (2013.01); F01D 25/02 (2013.01); F05D 2260/213 (2013.01)

(58) Field of Classification Search
CPC .......... F01D 25/12; F01D 25/02; F01D 17/16; F01D 9/065; F05D 2260/213
See application file for complete search history.

(56) References Cited

U.S. PATENT DOCUMENTS

| | | | | |
|---|---|---|---|---|
| 2,961,150 A | * | 11/1960 | Pirtle | .................... F01D 25/162 415/177 |
| 9,909,448 B2 | | 3/2018 | Gerstler et al. | |
| 10,196,932 B2 | | 2/2019 | Sennoun | |
| 10,598,191 B2 | * | 3/2020 | Scholtes | ............... F04D 29/544 |
| 11,015,468 B2 | | 5/2021 | Zaccardi et al. | |
| 11,156,114 B2 | | 10/2021 | Chalaud et al. | |
| 2021/0317799 A1 | | 10/2021 | Dubois et al. | |
| 2023/0358149 A1 | | 11/2023 | Levisse et al. | |
| 2024/0401491 A1 | * | 12/2024 | Khalid | .................... F01D 5/145 |

FOREIGN PATENT DOCUMENTS

WO    2012066262 A2    5/2012

OTHER PUBLICATIONS

European Search Report dated Aug. 8, 2025, in connection with European Application No. 25180221.1, 6 pages.

* cited by examiner

*Primary Examiner* — Courtney D Heinle
*Assistant Examiner* — John S Hunter, Jr.

(57) ABSTRACT

A swirl recovery vane (SRV) includes a trunnion configured to pivotally connect to an exterior surface of an inner platform of an SRV structure system. The SRV includes a body extending radially from the trunnion to an unshrouded distal vane tip of the vane. The SRV includes a heat exchanger that includes a gas inlet configured to couple a bleed air valve of a compressor section of a gas generator to a gas channel. The heat exchanger includes the gas channel adapted to: enable gas to flow into the gas inlet as cool gas and out through a gas outlet as warm gas; and extend into the body of the vane to enable heat transfer from a heat source within the vane to the cool gas. The heat exchanger includes the gas outlet configured to output the warm gas from the channel to an ambient environment outside of the vane.

20 Claims, 6 Drawing Sheets

THERMAL MANAGEMENT SYSTEM FOR GAS TURBINE ENGINE WITH OPEN PROPULSOR

TECHNICAL FIELD

This disclosure relates generally to aircraft. More specifically, this disclosure relates to a thermal management system for a gas turbine engine with open propulsor.

BACKGROUND

Various types and configurations of aircraft propulsion systems are known in the art. Various types and configurations of anti-icing systems for aircraft propulsion systems are also known in the art. While these known aircraft propulsion systems and anti-icing systems have various benefits, there is still room in the art for improvement.

Open rotor engines require higher gear ratios than other turbine engine configurations. Both the gear reduction and the lack of confined bypass cooling air associated with open rotor configurations can present thermal management challenges.

SUMMARY

This disclosure relates to a thermal management system for a gas turbine engine with open propulsor.

In a first embodiment, a swirl recovery vane (SRV) is provided. The SRV includes a trunnion configured to pivotally connect to an exterior surface of an inner platform of an SRV structure system. The SRV includes a body that extends radially from the trunnion to an unshrouded distal vane tip of the vane. The SRV includes a heat exchanger that includes a gas inlet, a gas channel, and a gas outlet. In the heat exchanger, the gas inlet is configured to couple a bleed air valve of a compressor section of a gas generator to the gas channel. In the heat exchanger, the gas channel is adapted to: enable gas to flow in through the gas inlet as cool gas and out through a gas outlet as warm gas; and extend into the body of the vane to enable heat transfer from a heat source within the vane to the cool gas. In the heat exchanger, the gas outlet is configured to output the warm gas from the channel to an ambient environment outside of the vane.

In a second embodiment, a swirl recovery vane (SRV) structure system is provided. The SRV structure system includes an inner platform; and a plurality of open swirl recovery vanes arranged circumferentially around the inner platform and an axis. Each vane is connected to the inner platform and extends radially, relative to the axis, from a trunnion pivotally connected to an exterior surface of the inner platform to an unshrouded distal vane tip of the vane. At least one from among the plurality of vanes includes a heat exchanger. The heat exchanger includes a gas inlet configured to couple a bleed air valve of a compressor section of a gas generator to a gas channel. The heat exchanger includes a gas inlet, a gas channel, and a gas outlet. In the heat exchanger, the gas inlet is configured to couple a bleed air valve of a compressor section of a gas generator to the gas channel. In the heat exchanger, the gas channel is adapted to: enable gas to flow in through the gas inlet as cool gas and out through a gas outlet as warm gas; and extend into the body of the vane to enable heat transfer from a heat source within the vane to the cool gas. In the heat exchanger, the gas outlet is configured to output the warm gas from the channel to an ambient environment outside of the vane.

In some embodiments of the SRV structure system, the bleed air valve of the compressor section is located within a low pressure compressor of the gas generator. In some embodiments of the SRV structure system, the gas outlet comprises at least one hole in an exterior surface of the vane. In some embodiments of the SRV structure system, the gas channel is located proximate to a center between opposing side exterior surfaces of the vane.

In some embodiments of the SRV structure system, the at least one vane from among the plurality of vanes further comprises a fluid heat exchanger. The fluid heat exchanger comprises: a fluid inlet; a fluid outlet; and a fluid channel adapted to enable hot fluid to flow between the fluid inlet and fluid outlet, wherein the fluid channel extends into the body of at least one vane. The fluid heat exchanger further comprises a manifold that comprises the fluid inlet. The manifold is configured to couple a fluid supply to the fluid channel such that the fluid supply is fluidly coupled to the fluid channel through the fluid inlet through the manifold. The trunnion comprises the manifold. The trunnion is configured to pivotally connect to the exterior surface of the inner platform of the SRV structure system. The fluid channel is located proximate to at least one from among opposing side exterior surfaces of the vane. The fluid inlet is configured to couple the fluid channel to an oil pump associated with an oil supply circuit that receives oil from an oil tank. The fluid outlet is configured to couple the fluid channel to an oil pump associated with an oil return circuit inputs oil to an oil tank. The heat source within the vane comprises the hot fluid.

In some embodiments of the SRV structure system, the trunnion is configured to pivotally connect to the exterior surface of the inner platform of the SRV structure system, thereby enabling variable pitch of the vane.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1A through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

This disclosure provides a swirl recovery vane (SRV) open rotor architecture in which the vanes are used as heat exchangers to reduce or eliminate use of other heat exchangers that impart a drag inefficiency on bypass air or core air such as air oil coolers (AOCs). More particularly, this disclosure provides an SRV heat exchanger in which oil enters through a manifold in the SRV trunnion. One of the benefits of the SRV heat exchanger is that the SRV has considerable surface area for improved heat convection. Integrating heat exchanging capability into the SRV allows for the reduction in size or elimination of the core mounted air oil heat exchanger (referred to as "AOC") and scoops in the nacelle associated with the AOC. That is, an additional benefit of the SRV heat exchanger includes eliminating the AOC. Elimination of the AOC from an open rotor architecture reduces drag and weight, which together results in a net benefit of reducing fuel burn (for example, a rate of fuel consumption) and increasing the thrust specific fuel consumption (TSFC). Further, using the SRV as a heat exchanger may provide a benefit of anti-icing the vane.

The open rotor configuration of the propulsor can include Swirl Recovery Vanes (SRVs), configured as large, non-rotating, actuated vanes. An open rotor propulsor eliminates a fan duct and decreases available air pressure for heat transfer through a traditional AOC. The large surface area of the SRVs can help compensate for decreased duct pressure while still accomplishing suitable heat transfer.

At ground idle, a typical thermal management system (TMS) sizing point, compressor bleed air, such as air bled from a low pressure compressor (LPC) of gas generator 40, can be routed through the SRVs to provide another cold sink, which enhances the ability of the SRV heat exchanger to reduce or eliminate the use of AOCs.

Figure 1A:
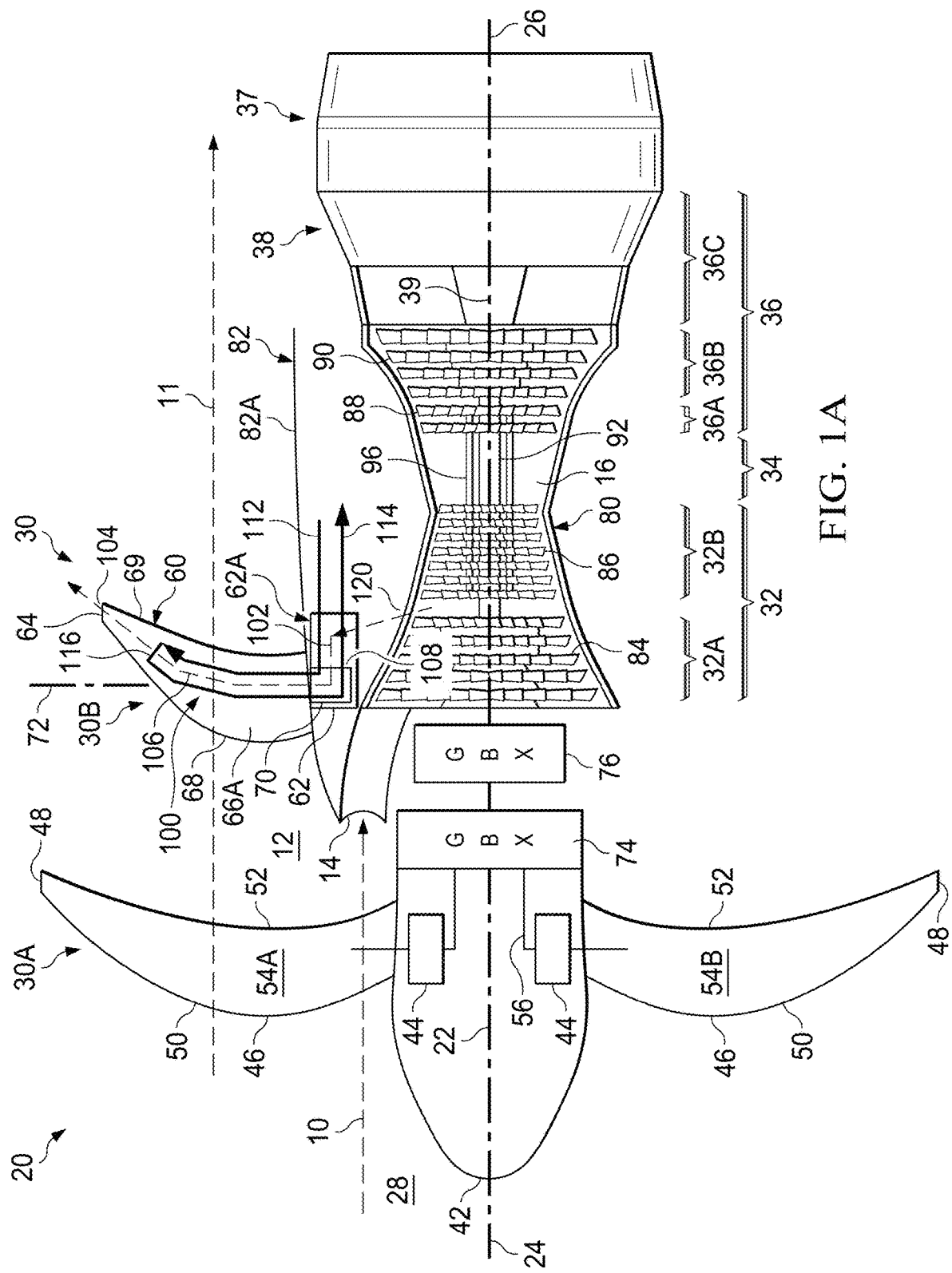
FIG. 1A illustrates a cross-section of a first propulsion system for an open-rotor aircraft that includes a swirl recovery vane heat exchanger, according to embodiments of this disclosure.
Figure 1B:
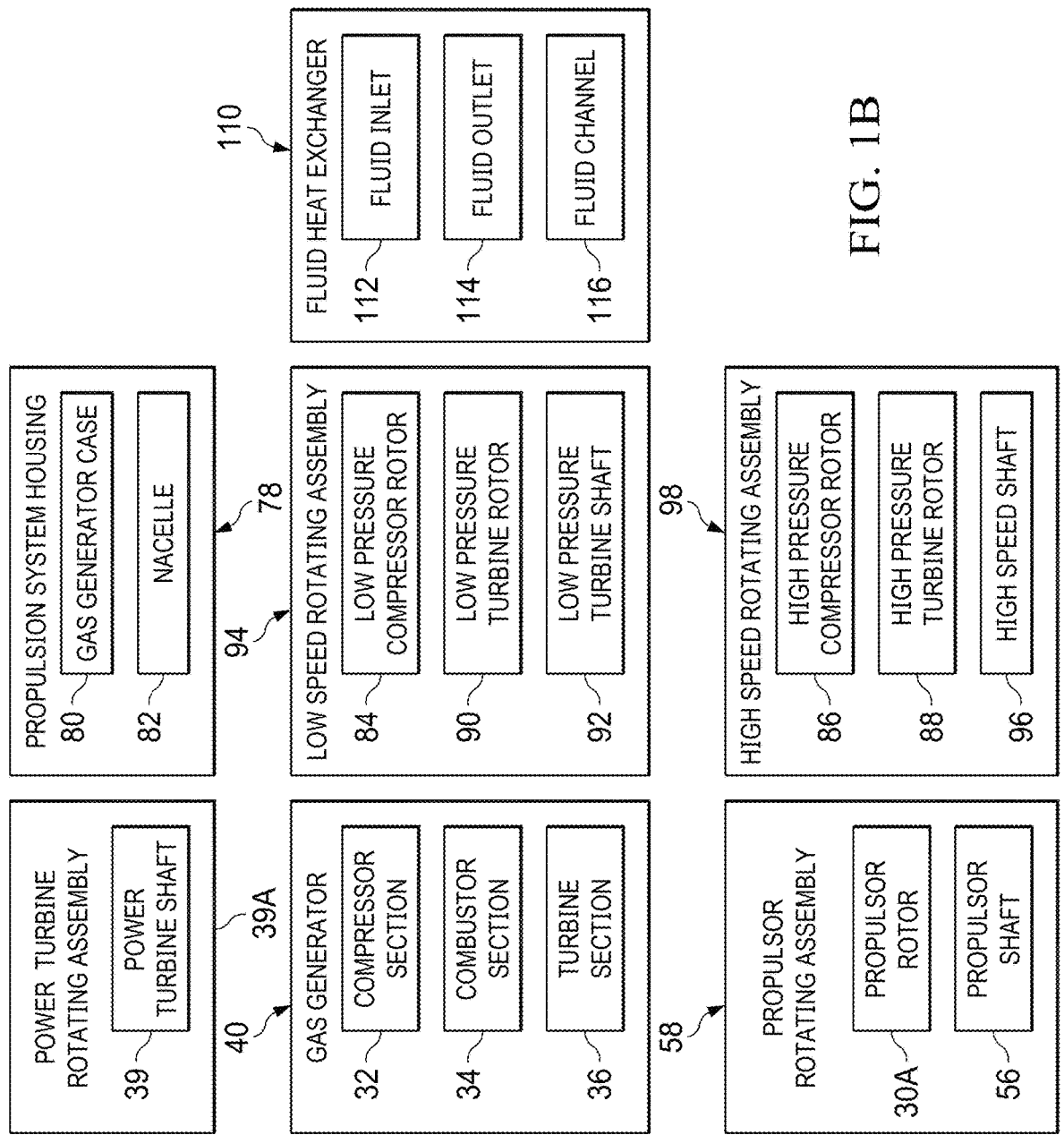
FIG. 1B illustrates a block diagram of various components within the first propulsion system for an open-rotor aircraft that includes a swirl recovery vane heat exchanger of FIG. 1A.

FIG. 1. refers to FIGS. 1A and 1B of this disclosure. FIG. 1 illustrates a cross-section of a first propulsion system 20 for an open-rotor aircraft that includes a swirl recovery vane heat exchanger 100, according to embodiments of this disclosure. The swirl recovery vane heat exchanger 100 is described further below, following a description of the first propulsion system 20 for an open-rotor aircraft. The aircraft may be an airplane, a drone (e.g., an unmanned aerial vehicle (UAV)) or any other manned or unmanned aerial vehicle or system. The aircraft propulsion system 20 extends axially along an axis 22 between a forward, upstream end 24 of the aircraft propulsion system 20 and an aft, downstream end 26 of the aircraft propulsion system 20. The axis 22 may be a centerline axis of the aircraft propulsion system 20 and/or one or more of its components. The axis 22 may also or alternatively be a rotational axis of one or more components of the aircraft propulsion system 20.

The aircraft propulsion system 20 is configured as an open rotor propulsion system, for example, a single rotor and swirl recovery vane (SRV) open rotor propulsion system.

Here, the term "open" may describe a propulsion system section and/or a propulsion system component that is open to an environment 28 (e.g., an ambient environment) external to an aircraft associated with the aircraft propulsion system 20.

The aircraft propulsion system 20 includes an open propulsion section 30, a compressor section 32, a combustor section 34, and a turbine section 36. The open propulsion section 30 (also referred to as "propulsion module") includes an open propulsor rotor 30A and a swirl recovery vane structure (also referred to as "open guide vane structure") 30B as propulsion module members 30A-30B. The open propulsor rotor 30A (also referred to as "bladed propulsor rotor") is configured as an open rotor (e.g., an un-ducted rotor) which projects radially into and is exposed to the external environment 28. The compressor section 32 includes a low pressure compressor (LPC) section 32A and a high pressure compressor (HPC) section 32B. The turbine section 36 includes a high pressure turbine (HPT) section 36A and a low pressure turbine (LPT) section 36B. The turbine section 36, in some embodiments, may include a power turbine (PT) section 36C that includes a power turbine 38 that drives a power turbine shaft 39. The aircraft propulsion system 20 also includes an exhaust section 37. The LPT section 36B can be referred to as an intermediate pressure turbine (IPT) section in between the HPT section 36A and the PT section 36C. The aircraft propulsion system 20 includes a propulsor shaft 56, a low speed shaft 92, a high speed shaft 96, and a PT shaft 39 that are rotatable. At least (or only) the LPC section 32A, the HPC section 32B, the combustor section 34, the HPT section 36A, the LPT section 36B, and the PT section 36C collectively form a gas generator 40 (for example, a turbine engine core).

The propulsion module members 30A-30B are un-ducted and unshrouded components of the aircraft propulsion system 20. The open propulsion section 30 includes a nose cone 42 disposed at (e.g., on, adjacent or proximate) the propulsion system upstream end 24. The nose cone 42 can be configured as a spinner which is rotatable with the propulsor rotor 30A about the axis 22. Alternatively, the nose cone 42 can be configured as a stationary structure of the propulsion module 30.

The propulsor rotor 30A includes a rotor base 44 (e.g., a disk or a hub) and a plurality of open propulsor blades 46 (e.g., airfoils). The propulsor blades 46 are arranged circumferentially around the rotor base 44 and the axis 22 in an array. Each of the propulsor blades 46 is connected to (e.g., formed integral with or otherwise attached to) the rotor base 44.

Each propulsor blade 46 projects spanwise along a span line of the respective propulsor blade 46 (e.g., radially relative to the axis 22) out from an exterior surface 44A of the rotor base 44, into the external environment 28, to an unshrouded, distal tip 48 of the respective propulsor blade 46. In other embodiments, some or all of the propulsor blades 46 may each be pivotally connected to the rotor base 44. More particularly, some or all of the propulsor blades 46 include a propulsor blade-based (PBB) trunnion configured to pivotally connect to the exterior surface 44A of the rotor base 44. Some of or all of the propulsor blades 46 may be configured to pivot about a PBB pivot axis of the respective propulsor blade 46. For example, the PBB trunnion can rotate about the PBB pivot axis to change a pitch angle of the propulsor blade 46, thereby enabling a variable pitch propulsor blade 46.

Each propulsor blade 46 is thereby configured as an un-ducted and unshrouded propulsor blade which is exposed to (e.g., disposed in) the surrounding external environment 28. Each propulsor blade 46 extends longitudinally along a mean line (e.g., a camber line) of the respective propulsor blade 46 from a leading edge 50 of the respective propulsor blade 46 to a trailing edge 52 of the respective propulsor blade 46. Each propulsor blade 46 extends laterally between and to opposing side exterior surfaces 54A and 54B (generally referred to as "54") of the respective propulsor blade 46. The first blade exterior surface 54A may be a concave, pressure side surface of the respective propulsor blade 46. The second blade exterior surface 54B may be a convex, suction side surface of the respective propulsor blade 46. Each of these blade exterior surfaces 54 extends longitudinally along the blade mean line between and meet at the respective blade leading edge 50 and the respective blade trailing edge 52. Each blade element 50, 52, 54A, 54B extends spanwise from the base exterior surface 44A to the respective blade tip 48.

The propulsor rotor 30A is arranged axially along the axis 22 between the nose cone 42 and the SRV structure 30B. The propulsor rotor 30A is arranged axially downstream of the nose cone 42 and axially upstream of the SRV structure 30B. A forward, upstream end of the propulsor rotor 30A may be disposed axially next to (e.g., adjacent, slightly spaced from) an aft, downstream end of the nose cone 42. An aft, downstream end of the propulsor rotor 30A may be disposed axially next to a forward, upstream end of the SRV structure 30B. This disclosure is not limited having a propulsor rotor 30A positioned aft of a nose cone 42. Rather, in some embodiments, the nose cone 42 extends aft of the propulsor rotor 30A with the propulsor blades 46 extending through openings in the nose cone 42.

The propulsor rotor 30A is connected to a propulsor shaft 56. At least (or only) the propulsor rotor 30A and the propulsor shaft 56 collectively form a propulsor rotating assembly 58. This propulsor rotating assembly 58 and its members 30A and 56 are rotatable about the axis 22.

The SRV structure 30B includes a plurality of swirl recovery vanes 60 and an inner platform 62. The swirl recovery vanes 60 are also referred to as airfoils, open guide vanes, or guide vanes, or vanes 60. Vanes 60 are stationary, for example, non-rotating with respect to the axis 22. Vanes 60 may be fewer or greater in number than, or the same in number as, the number of propulsor blades 46 and typically greater than two, or greater than four, in number. The guide vanes 60 are arranged circumferentially around the inner platform 62 and the axis 22 in an array.

Each guide vane 60 projects spanwise along a span line of the respective guide vane 60 (e.g., radially relative to the axis 22) out from an exterior surface 62A of the inner platform 62, into the external environment 28, to an unshrouded, distal vane tip 64 of the respective guide vane 60. Each guide vane 60 is thereby configured as an un-ducted and unshrouded guide vane which is exposed to (e.g., disposed in) the surrounding external environment 28. Vanes 60 may have a shorter span than propulsor blades 46. In some embodiments, the span of the vanes 60 is 50% of the span of propulsor blades 46, or the vanes 60 may have a longer span or the same span as propulsor blades 46 as desired. Each guide vane 60 extends laterally between and to opposing side exterior surfaces 66A and 66B (generally referred to as "66") of the respective guide vane 60. The first vane exterior surface 66A may be a convex, suction side surface of the respective guide vane 60. The second vane exterior surface 66B may be a concave, pressure side surface of the respective guide vane 60. Each of these vane exterior surfaces 66 extends longitudinally along the vane mean line between (and meet at) a respective vane leading edge 68 and a respective vane trailing edge 69. Each guide vane 60 extends longitudinally along a mean line (e.g., a camber line) of the respective guide vane 60 from a leading edge 68 of the respective guide vane 60 to a trailing edge 69 of the respective guide vane 60. Each vane element 66A, 66B, 68, 69 extends spanwise from the platform exterior surface 62A to the respective vane tip 64.

In the illustrative example, the vanes 60 are coupled to an exterior surface 62A of the platform 62 associated with an engine nacelle 82. In other examples, the vanes 60 may be attached to an aircraft structure associated with the propulsion system 20 or another aircraft structure, such as a wing, pylon, or fuselage. As illustrated in FIG. 1, each of the guide vanes 60 is connected to the inner platform 62. In some embodiments, each of the guide vanes 60 may be a fixed guide vane which is fixedly connected to the inner platform 62 and/or an internal support structure covered by the inner platform 62. In other embodiments, some or all of the guide vanes 60 may each be a variable guide vane which is pivotally connected to the inner platform 62 and/or an internal support structure covered by the inner platform 62. More particularly, some or all of the guide vanes 60 may include a trunnion 70 configured to pivotally connect to the exterior surface 62A of the inner platform 62 of the SRV structure system 30B. Some of or all of the guide vanes 60 may be configured to pivot about a pivot axis 72 of the respective guide vane 60. For example, the trunnion 70 can rotate about the pivot axis 72 to change a pitch angle of the vane 60, thereby enabling a variable pitch vane 60.

The SRV structure 30B is axially downstream of the propulsor rotor 30A. As illustrated in FIG. 1, the SRV structure 30B is arranged axially between the propulsor rotor 30A and one or more sections (e.g., 32-36) of the gas generator 40, or an entirety of the gas generator 40. In some examples, an aft end of the SRV structure 30B may be disposed axially next to, or outboard of, a forward, upstream end of the gas generator 40 (for example, relative to fluid flow outside of the gas generator 40).

A drivetrain of the aircraft propulsion system 20 includes a first gearbox (also referred to as "geartrain") 74 (e.g., a transmission, a speed change device, an epicyclic geartrain, etc.) that is disposed between and operatively couples the propulsor rotating assembly 58 to a power turbine rotating assembly 39a (including to the power turbine shaft 39). A drivetrain may include a second gearbox 76 that operatively couples the propulsor rotating assembly 58 to a power turbine rotating assembly 39a and is arranged axially between the first gearbox 74 and a power turbine rotating assembly 39a. For example, one end of the second gearbox 76 can be coupled to the first gearbox 74, and an opposite end of the second gearbox 76 can be coupled to the power turbine rotating assembly 39a.

The engine sections 32A, 32B, 34, 36A, 36B, and 36C may be arranged sequentially along the axis 22 between the upstream end 24 and the downstream end 26. With this arrangement, each engine section 32A, 32B within the compressor section 32 is arranged axially along the axis 22 between the propulsion module 30 (including propulsion module members 30A-30B) and the combustor section 34. More particularly, the compressor section 32 is arranged axially between the second gearbox 76 and the combustor section 34. In FIG. 1, exhaust section 37 is arranged axially along the axis 22 aft relative to the PT section 36C. Not shown however, in some embodiments, the exhaust section 37 can be arranged axially along the axis 22 between the propulsion module 30 and the turbine section 36. The engine sections 32A, 32B, 34, 36A, 36B, and 36C are housed within a stationary housing (referred to as "propulsion system housing" or "engine housing") 78 of the aircraft propulsion system 20. This propulsion system housing 78 includes a gas generator case 80 (e.g., a core case) and a nacelle 82.

The gas generator case 80 houses one or more of the propulsion system sections 32A-36C (for example, the gas generator 40). Each of the engine sections 32A and 32B of the compressor section 32, the HPT section 36A, and the LPT section 36B includes a respective bladed rotor 84, 86, 88, and 90, respectively. Analogously, the PT 38 drives the propulsor rotor 30A, around which the propulsor blades 46 are arranged circumferentially. The LPC section 32A includes one or more low pressure compressor (LPC) rotors 84. The HPC section 32B includes one or more high pressure compressor (HPC) rotors 86. The HPT section 36A includes one or more high pressure turbine (HPT) rotors 88. The LPT section 36B includes one or more low pressure turbine (LPT) rotors 90. Each of the bladed rotors 84-90 is configured as a ducted rotor internal within the aircraft propulsion system 20. That is, each of the bladed rotors 84, 86, 88, and 90 is a ducted and/or shrouded engine rotor. Each of these engine rotors 84-90 includes a rotor base (e.g., a disk or a hub) and a plurality of rotor blades (e.g., airfoils, vanes, etc.). The rotor blades are arranged circumferentially around the respective rotor base and the axis 22 in an array. The rotor blades may also be arranged into one or more stages longitudinally along a core flowpath 10. Each of the rotor blades is connected to the respective rotor base. Each of the rotor blades projects radially (e.g., spanwise) out from the respective rotor base into the core flowpath 10 and to distal tip of the respective rotor blade. The gas generator case 80 extends axially along (e.g., axially overlaps) and extends circumferentially about (e.g., circumscribes) the engine sections 32A-36C and their respective bladed rotors 84-90. The gas generator case 80 may also house the drivetrain (including first and second gearboxes 74 and 76).

The LPC rotor 84 is coupled to and rotatable with the LPT rotor 90. For example, the LPC rotor 84 is connected to the LPT rotor 90 through a low speed shaft 92. At least (or only) the LPC rotor 84, the LPT rotor 90 and the low speed shaft 92 collectively form a low speed rotating assembly 94, for example, a low speed spool of the gas generator 40. This low speed rotating assembly 94 and its members 84, 90 and 92 are rotatable about the axis 22. Alternatively, the low speed rotating assembly 94 may be rotatable about another axis radially and/or angularly offset from the axis 22. The low speed rotating assembly 94 may be coupled to the propulsor rotating assembly 58. For example, the low speed rotating assembly 94 is connected to the propulsor rotating assembly 58 through the drivetrain, such as through the first gearbox 74. With this arrangement, the low speed rotating assembly 94 (including the LPT rotor 90) may rotate at a different (e.g., faster) rotational velocity than the propulsor rotating assembly 58 (including the propulsor rotor 30A).

The HPC rotor(s) 86 is/are coupled to and rotatable with the HPT rotor(s) 88. For example, the HPC rotor(s) 86 is/are connected to the HPT rotor 88 through a high speed shaft 96. At least (or only) the HPC rotor(s) 86, the HPT rotor(s) 88 and the high speed shaft 96 collectively form a high speed rotating assembly 98 (for example, a high speed spool of the gas generator 40). This high speed rotating assembly 98 and its members 86, 88 and 96 are rotatable about the axis 22. Alternative, the high speed rotating assembly 98 may be rotatable about another axis radially and/or angularly offset from the axis 22.

The nacelle 82 houses and provides an aerodynamic cover over the gas generator case 80. An exterior wall 82A of the nacelle 82 is disposed radially outboard of, extends axially along (e.g., axially overlaps) and extends circumferentially about (e.g., circumscribes) the gas generator 40 and its gas generator case 80. With this arrangement, the bladed rotors 84-90 are disposed within the propulsion system housing 78. The propulsor rotor 30A is disposed at least partially (or completely) outside of the propulsion system housing 78. In FIG. 1, the propulsor rotor 30A and the SRV structure 30B are arranged outside of the propulsion system housing 78.

During operation of the aircraft propulsion system 20, the propulsor rotor 30A propels ambient air within the external environment 28 in an aft, downstream direction towards the propulsion system downstream end 26. A major portion (e.g., more than 50%) of this air bypasses the gas generator 40 to provide forward thrust while a minor portion (e.g., less than 50%) of the air flows into the gas generator 40. For example, this major portion forms an outer stream 11 of bypass air, while this minor portion forms an inner stream (referred to as core flowpath 10) of core air. The outer stream 11 of the air propelled by the propulsor rotor 30A flows axially across a SRV structure 30B of the propulsion section 30 and outside of the propulsion system housing 78 (along the nacelle exterior wall 82A of nacelle 82). The outer stream 11 passes through an intermediate area 12, which is located aft or downstream of the propulsor blades 46 and located upstream of the vanes 60. The bypass air within the intermediate area 12 may exhibit circumferential swirl. The SRV structure 30B is configured to condition (e.g., straighten out) the air propelled by the propulsor rotor 30A to remove or reduce circumferential swirl and thereby enhance the forward thrust. Particularly, the vanes 60 are sized, shaped, and configured to impart a counteracting swirl to the fluid (e.g., air) so that in a downstream direction aft of both propulsor blades 46 and vanes 60 the fluid has a greatly reduced degree of swirl. The reduced degree of swirl translates to an increased level of induced efficiency.

The bypass air within the intermediate area 12 has a higher total pressure ($P_1$) than the pressure ($P_0$) of the ambient air within the external environment 28 upstream relative to the propulsor blades 46. In order for an open rotor propulsion system to obtain the same thrust as a ducted rotor propulsion system, the inlet area of the open rotor propulsion system must be larger than the inlet area of the ducted rotor propulsion system, in order to compensate for the open rotor propulsion system having a lower fan pressure ratio (FPR) than a ducted rotor propulsion system. Thrust generated by a rotor propulsion system can be approximated according to Equation 1, which simplifies (for example, does not account for) drag effects and thrust associated with the core flow.

$$\text{Thrust} = \text{FPR} \times \text{inlet area} \quad (1)$$

The inner stream of the air propelled by the propulsor rotor 30A flows through an airflow inlet 14 of a core flowpath 10 into the aircraft propulsion system 20 and its gas generator 40. The flowpath inlet 14 may be configured as an airflow inlet into the gas generator 40 or, more generally, the aircraft propulsion system 20. The air entering the core flowpath 10 may be referred to as "core air". The core flowpath 10 extends longitudinally in the gas generator 40 from an airflow inlet 14 into the core flowpath 10 to a combustion products exhaust from the core flowpath 10. More particularly, the core flowpath 10 extends sequentially through the LPC section 32A, the HPC section 32B, the combustor section 34, the HPT section 36A, the LPT section 36B, and PT section 36C from the core inlet 14 to a combustion products exhaust from the core flowpath 10 into the external environment 28. The flowpath exhaust may be configured as a combustion products exhaust from the gas generator 40 or, more generally, the aircraft propulsion system 20.

During operation of the aircraft propulsion system 20, core air is compressed by the LPC rotor(s) 84 and the HPC rotor(s) 86 and directed into a combustion chamber 16 (e.g., an annular combustion chamber) of a combustor (e.g., an annular combustor) in the combustor section 34. Fuel is injected into the combustion chamber 16 and mixed with the compressed core air to provide a fuel-air mixture. This fuel-air mixture is ignited and combustion products of the ignited fuel-air mixture flow through and sequentially drive rotation of the HPT rotor(s) 88 and the LPT rotor(s) 90. The rotation of the HPT rotor(s) 88 and the LPT(s) rotor 90 respectively drive rotation of the HPC rotor(s) 86 and the LPC rotor(s) 84 and, thus, compression of the air received from the core inlet 14. Core airflow exhausted from the LPT section 36B may drive rotation of the power turbine rotating assembly 39A, which in turn may drive the rotation of the propulsor rotor 30A via the power turbine shaft 39. For example, the PT shaft 39 can drive the rotation of the propulsor rotor 30A through the drivetrain (including first and/or second gearboxes 74 and/or 76). The rotation of the propulsor rotor 30A, in turn, propels the ambient air within the external environment 28 in the aft, downstream direction. With this arrangement, the gas generator 40 powers operation of (e.g., drives rotation of) the propulsor rotor 30A during aircraft propulsion system operation.

A swirl recovery vane heat exchanger 100 can be a component of the swirl recovery vane (SRV) structure system 30B. As introduced above, the SRV structure system 30B includes the inner platform 62 and the plurality of vanes 60 arranged circumferentially around the inner platform 62 and axis 22. Each vane 60 is connected to the inner platform 62 and extends radially relative to the axis 22 from a trunnion 70 pivotally connected to an exterior surface 62A of the inner platform 62 to an unshrouded distal vane tip 64 of the vane 60. At least one (or all) among the plurality of vanes 60 includes a swirl recovery vane heat exchanger 100.

Within the vane 60, the swirl recovery vane heat exchanger 100, which can be configured as an air-based heat exchanger, includes a gas inlet 102, a gas outlet 104, and a gas channel 106 that spans from the gas inlet 102 to the gas outlet 104. The swirl recovery vane heat exchanger 100 can include a manifold 108, which can be integral with the trunnion 70. That is, the trunnion 70 includes the manifold 108. Additionally, the swirl recovery vane heat exchanger 100 can include a fluid heat exchanger 110 that includes a fluid inlet 112, a fluid outlet 114, and a fluid channel 116 that is adapted to enable hot fluid (such as oil) to flow between the fluid inlet 112 and fluid outlet 114. As such, the hot fluid within the fluid channel 116 functions as a heat source within the vane 60. The fluid channel 116 spans from the fluid inlet 112 to the fluid outlet 114 and extends into the body of the vane 60. For simplification, the fluid heat exchanger 110 is described herein in a case in which the working fluid is oil, such as a lubricating oil; however, the working fluid of this disclosure is not limited to being oil. In some embodiments, a working fluid of the fluid heat exchanger 110 includes an alternative coolant fluid such as, but not limited to, refrigerants, ammonia-based coolants, ethylene glycol (EG), propylene glycol (PG), or propylene glycol with water (PGW), or other suitable coolant fluid alternatives to oil.

The gas inlet 102 is configured to couple a bleed air valve 120 of a compressor section 32 (such as the LPC section 32A) of a gas generator 40 to the gas channel 106. In some examples, the bleed air valve 120 of the compressor section 32 may be located within the low-pressure compressed-air (LPC) section 32A of gas generator 40.

The gas (such as air) that exits through the gas outlet 104 can be referred to as the LPC bleed air. The gas channel 106 is adapted to enable gas (e.g., core air) to flow in through the gas inlet 102 as cool gas and out through a gas outlet 104 as warm gas. The gas channel 106 is adapted to extend into a body of the vane 60 to enable heat transfer from a heat source (such as hot fluid oil within the fluid heat exchanger 110) within the vane 60 to the cool gas. In some embodiments, the gas channel 106 is located proximate to a center between the opposing side exterior surfaces 66A and 66B of the vane 60.

The gas outlet 104 outputs the warm gas from the gas channel 106 to an external environment 28 outside of the vane 60. In some embodiments, the gas outlet 104 includes at least one hole in an exterior surface of the vane 60, such as an exterior surface 66A or 66B or an exterior surface of distal vane tip 64.

Figure 2:
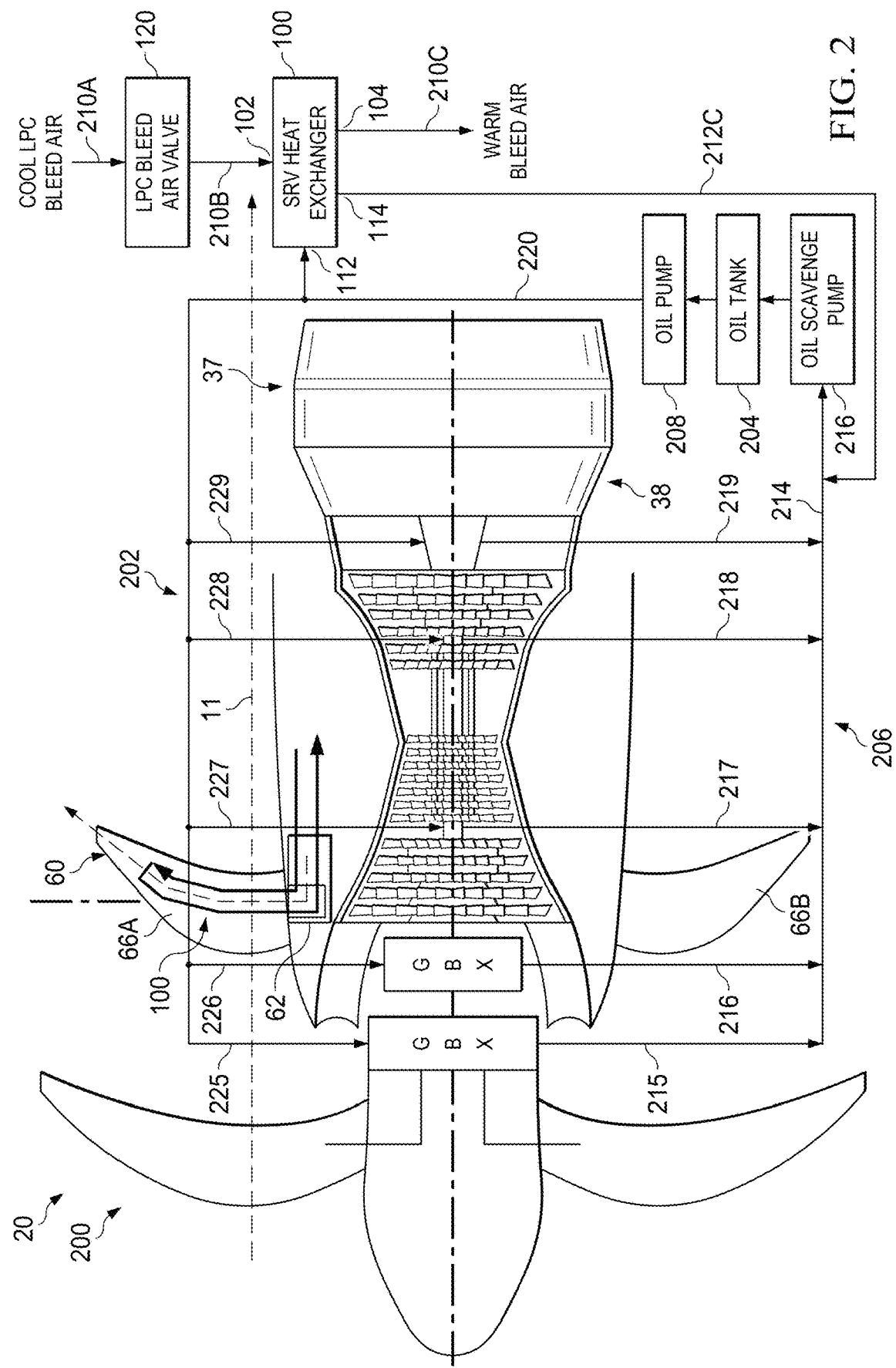
FIG. 2 illustrates the cross-section of the first propulsion system for an open-rotor aircraft that includes the swirl recovery vane heat exchanger of FIG. 1 within a thermal management system, according to embodiments of this disclosure.

The fluid heat exchanger 110 includes a manifold that includes the fluid inlet 112 and is configured to couple a fluid supply (such as a bleed port associated with the oil return circuits 215-219 of FIG. 2) to the fluid channel 116 such that the fluid supply is fluidly coupled to the fluid channel 116 through the fluid inlet 112 through the manifold. The manifold of the fluid heat exchanger 110 can be the manifold 108 or can be an additional manifold designed for oil.

In some embodiments, the fluid channel 116 is located proximate to an exterior surface 66 of the vane 60, such as at least one from among the opposing side exterior surfaces 66A and 66B. This location provides two heat sinks on opposite sides of the fluid channel 116, which is an advantage to cool hot oil faster. The outer stream 11 of bypass air from the intermediate area 12 functions as a convection heat sink that receives (absorbs) heat from the exterior facing side of the fluid channel 116. The cool air within the gas channel 106 functions as another heat sink that receives heat from the interior facing side of the fluid channel 116, thereby warming the air within the gas channel 106.

Anti-icing is a practical advantage that the SRV heat exchanger 100 provides, and this ice protection benefit results from the entire body of the vane 60 being warmed by the hot oil as that heat from the working fluid is dissipated to the external environment 28 via the heat transferred to the core flowpath 10 (for example also, via the warm bleed air 210C shown in FIG. 2). In the event that anti-icing is less than 100% successful, the SRV heat exchanger 100 provides a secondary ice protection benefit that is to de-ice. As a comparison, de-ice is the act of removing ice that has built up and is performed intermittently, but anti-ice is the prevention of ice from building up and is typically enabled for the full duration of operation during icing conditions. De-icing occurs when the warmed air within the gas channel 106 exits through the gas outlet 104, as the exiting warm air transfers heat ice on the exterior surface 66 of the vane 60. For ease of illustration, only one gas channel 106 is shown, however, the air-based portion of the heat exchanger 100 can include multiple gas channels 106 that receive cool air through the gas inlet 102, receive heat from the heat source that is hot fluid oil traversing through the fluid channel 116, and output warm air through multiple gas outlets 104, respectively corresponding to the multiple fluid channels 116.

FIG. 2 illustrates the cross-section of the first propulsion system 20 for an open-rotor aircraft that includes the swirl recovery vane heat exchanger 100 of FIG. 1 within a thermal management system (TMS) 200, according to embodiments of this disclosure. The embodiment of the TMS 200 shown in FIG. 2 is for illustration only, and other embodiments could be used without departing from the scope of this disclosure. Particularly, the TMS 200 within the scope of this disclosure could have other TMS architectures that include additional components (which are not shown in FIG. 2) or that do not include omitted components (which are shown in FIG. 2) optionally removable from FIG. 2. For ease of illustration, the TMS 200 is illustrated a block diagram within which the SRV heat exchanger 100 is illustrated as block. However, it is understood that the SRV heat exchanger 100 is located within the vane 60, as shown in FIG. 1.

The TMS 200 includes an oil supply circuit 202 that receives oil from an oil tank 204, and an oil return circuit 206 that inputs oil to the oil tank 204. Although only one the oil tank 204 is shown, the TMS 200 can include a first oil tank from which the oil supply circuit 202 receives oil and a second oil tank into which the oil return circuit 206 inputs oil. The TMS 200 includes a first oil pump 208, which is associated with the oil supply circuit 202, and which pumps warm oil from the oil tank 204 an into the fluid inlet 112 of the heat exchanger 100. The fluid inlet 112 of the heat exchanger 100 is configured to couple the fluid channel 116 to the first oil pump 208 associated with the oil supply circuit 202. The TMS 200 includes the SRV heat exchanger 100 that not only transfers heat from the warm oil to bypass air of the outer stream 11 via heat conduction, but can also transfer heat from the warm oil to cool LPC bleed air 210. The fluid outlet 114 of the SRV heat exchanger 100 provides cool oil 212c to the oil return circuit 206. For example, a return channel 214 of the oil return circuit 206 inputs the cool oil 212 to a second oil pump (illustrated as oil scavenge pump) 216 that returns (by pumping) oil into the oil tank 204. That is, the fluid outlet 114 of the heat exchanger 100 is configured to couple the fluid channel 116 to the second oil pump 216 associated with the oil return circuit 206. The second oil pump 216 may be a standalone pump or may be integrated into a single pump along with first oil pump 208.

The return channel 214 receives warm oil inputs 215-219 from various heat-generating components of the gearboxes 74 and 76 and gas generator 40. That is, oil is heated by running/operating the engine during which the heat-generating components, such as the bearings, gearing, accessories, are lubricated by the oil. Analogous to the return channel 214, the first oil pump 208 also pumps oil into a supply channel 220 that feeds oil supplies 225-229 into the various heat generating components of the gearboxes 74 and 76 and gas generator 40. In general, the oil supply circuit 202 supplies (or circulates) cool oil, and the oil return circuit 206 receives (or circulates) warm or hot oil.

The bleed air valve 120 bleeds LPC bleed air 210 from within the compressor section 32 (for example, a station of the gas generator 40) and that is transferred to the gas inlet 102. The location of the bleed air valve 120 is not limited to being within the compressor section 32, but instead, the location of the bleed air valve 120 is where air is selectively extracted, based on the velocity of the bypass air of the outer stream 11 over the vane 60. For example, a first different velocity (v1) of the bypass air of the outer stream 11 over the vane 60 can cause the engine control to select to open (or close) a first bleed air valve 120 at a stage of the compressor section 32 of the gas generator 40, and a second different velocity (v2) of the bypass air of the outer stream 11 over the vane 60 can cause the engine control to select to open (or close) a second bleed air valve 120 in a different stage of the compressor section 32. As a simple explanation of the contents of the LPC bleed air 210, cool air 210B input to the gas inlet 102 includes all of the cool air 210A that the bleed air valve 120 bleeds out from the compressor section 32. However, in some embodiments, the cool air 210B entering gas inlet 102 can include a partial (namely, less than 100%) of the cool air 210A bled from the compressor section 32 (entering the bleed air valve 120). The SRV heat exchanger 100 outputs warm LPC bleed air 210C that has absorbed heat from the heat source (e.g., hot fluid oil) within the vane 60.

Although FIGS. 1 and 2 illustrate one example of an aircraft propulsion system 20 that includes a swirl recovery vane heat exchanger 100, various changes may be made to FIG. 1. For example, the inner platform 62, which is configured to couple to the aircraft propulsion system 20 having a three-spool gas generator 40 where the propulsor rotor 30A is driven by a power turbine of an engine having three-spool architecture, can be changed to the inner platform 362 of FIG. 3, which is configured to couple to aircraft propulsion system 300 having a two-spool gas generator without a power turbine.

Figure 3:
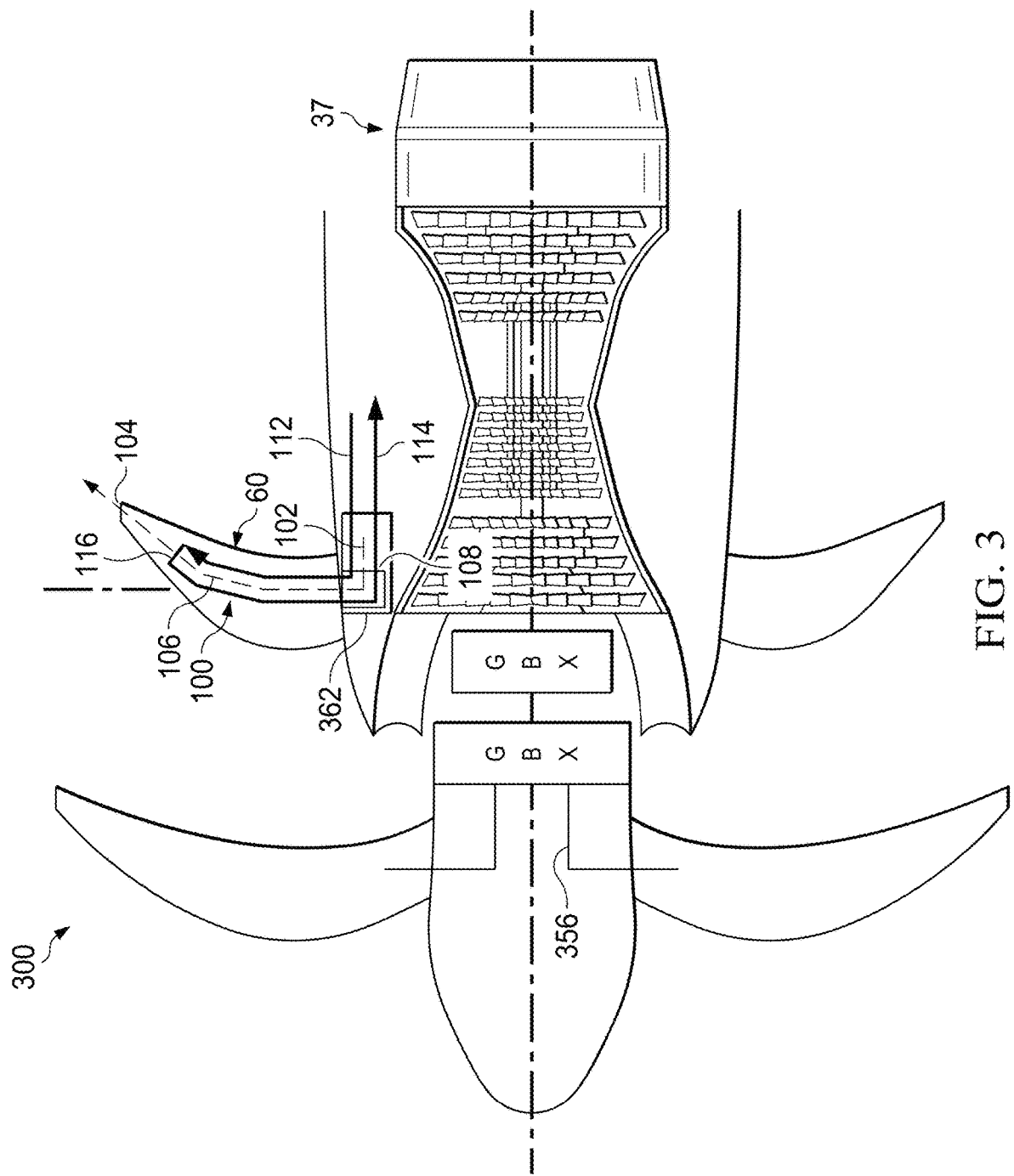
FIG. 3 illustrates a cross-section of a second propulsion system for an open-rotor aircraft that includes a swirl recovery vane heat exchanger, according to embodiments of this disclosure.

FIG. 3 illustrates a cross-section of a second propulsion system 300 for an open-rotor aircraft that includes a swirl recovery vane heat exchanger 100, according to embodiments of this disclosure. The embodiment of the second propulsion system 300 with the heat exchanger 100 shown in FIG. 3 is for illustration only, and other embodiments could be used without departing from the scope of this disclosure. The second propulsion system 300 of FIG. 3 can include components from the first propulsion system 20 of FIG. 1, such as the SRV heat exchanger 100. Some components of the second propulsion system 300, such as the propulsor shaft 356 and inner platform 362 and operate in the same manner as the corresponding components 56 and 62 from the first propulsion system 20 of FIG. 1.

The propulsor shaft 356 is configured to couple to the second propulsion system 300 driven by a low pressure turbine (LPT) shaft 92. The second propulsion system 300 can be a two-spool propulsor without a power turbine. In some examples, such as the two-spool architecture (e.g., without the power turbine 38), the low speed rotating assembly 94 may be coupled to the propulsor rotating assembly 58. Within the second propulsion system 300, the geartrain connects directly to the low speed rotating assembly, rather than to the power turbine shaft and the power turbine. Within the second propulsion system 300, the LPT rotor propels both the LPC rotor and the propulsor rotor. That is, rotation of the LPT rotor drives rotation of the propulsor rotor through the drivetrain (including first and/or second gearboxes).

Figure 4:
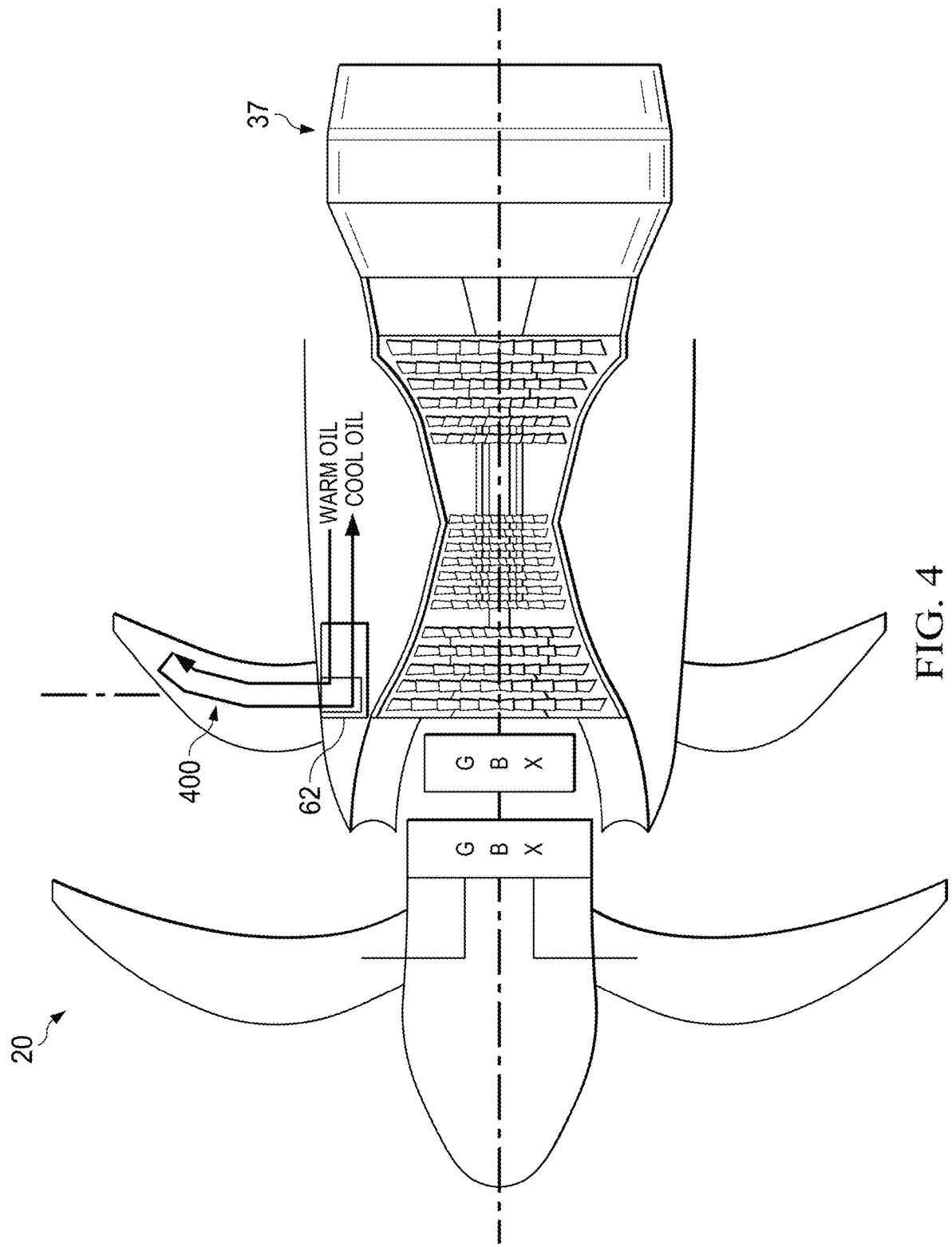
FIG. 4 illustrates a cross-section of the first propulsion system for an open-rotor aircraft that includes a swirl recovery vane oil-based heat exchanger, according to embodiments of this disclosure.

FIG. 4 illustrates a cross-section of the first propulsion system 20 for an open-rotor aircraft that includes a swirl recovery vane oil-based heat exchanger 400, according to embodiments of this disclosure. The embodiment of the SRV oil-based heat exchanger 400 shown in FIG. 4 is for illustration only, and other embodiments could be used without departing from the scope of this disclosure. The SRV oil-based heat exchanger 400 can be the same as the fluid heat exchanger 110 of FIG. 1. In other words, the SRV oil-based heat exchanger 400 can be the SRV heat exchanger 100 of FIG. 1 without the gas inlet 102, gas outlet 104, and gas channel 106. For simplification, the SRV oil-based heat exchanger 400 is described herein in a case in which the working fluid is oil, such as a lubricating oil; however, the working fluid of this disclosure is not limited to being oil. In some embodiments, a working fluid of the SRV oil-based heat exchanger 400 includes an alternative coolant fluid such as, but not limited to, refrigerants, ammonia-based coolants, ethylene glycol (EG), propylene glycol (PG), or propylene glycol with water (PGW), or other suitable coolant fluid alternatives to oil.

Figure 5:
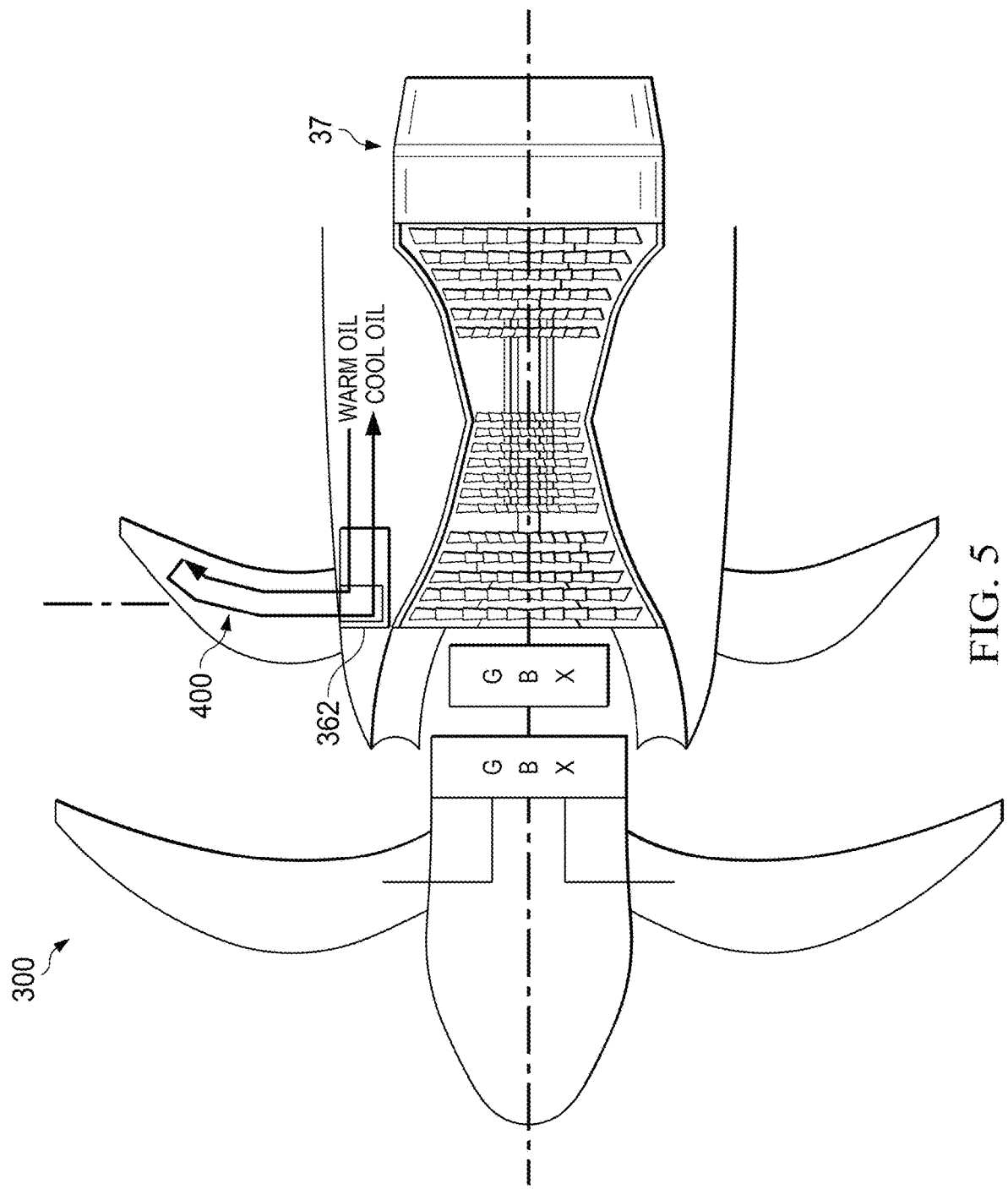
FIG. 5 illustrates a cross-section of the second propulsion system for an open-rotor aircraft that includes a swirl recovery vane oil-based heat exchanger, according to embodiments of this disclosure.

FIG. 5 illustrates a cross-section of the second propulsion system 300 for an open-rotor aircraft that includes a swirl recovery vane oil-based heat exchanger 400, according to embodiments of this disclosure. The embodiment of the SRV oil-based heat exchanger 400 shown in FIG. 5 is for illustration only, and other embodiments could be used without departing from the scope of this disclosure.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A swirl recovery vane (SRV) comprising:
a trunnion configured to connect to an exterior surface of an inner platform of an SRV structure system;
a body that extends radially from the trunnion to an unshrouded distal SRV tip of the SRV;
a heat exchanger located within the SRV, the heat exchanger comprising:
a gas inlet configured to couple a bleed air valve of a stage of a high or low compressor section of a gas generator to a gas channel;
the gas channel adapted to:
enable gas to flow in through the gas inlet as cool gas and out through a gas outlet as warm gas; and
extend into the body of the SRV to enable heat transfer from a heat source within the SRV to the cool gas; and
the gas outlet that outputs the warm gas from the gas channel to an ambient environment outside of the SRV.

2. The SRV of claim 1, wherein:
the bleed air valve of the compressor section is located within a low pressure compressor of the gas generator.

3. The SRV of claim 1, wherein the gas outlet comprises at least one hole in an exterior surface of the SRV.

4. The SRV of claim 1, wherein the gas channel is located proximate to a center between opposing side exterior surfaces of the SRV.

5. The SRV of claim 1, further comprising:
a fluid heat exchanger that comprises:
a fluid inlet;
a fluid outlet; and
a fluid channel adapted to enable hot fluid to flow between the fluid inlet and fluid outlet, wherein the fluid channel extends into the body of the SRV; and
the heat source comprises the hot fluid.

6. The SRV of claim 5, wherein:
the fluid heat exchanger comprises a manifold that comprises the fluid inlet and that is configured to couple a fluid supply to the fluid channel such that the fluid supply is fluidly coupled to the fluid channel through the fluid inlet through the manifold; and
the trunnion comprises the manifold.

7. The SRV of claim 5, wherein the fluid channel is located proximate to at least one from among opposing side exterior surfaces of the SRV.

8. The SRV of claim 5, wherein the fluid inlet is configured to couple the fluid channel to an oil pump associated with an oil supply circuit that receives oil from an oil tank.

9. The SRV of claim 5, wherein the fluid outlet is configured to couple the fluid channel to an oil pump associated with an oil return circuit that inputs oil to an oil tank.

10. The SRV of claim 1, wherein the trunnion is configured to pivotally connect to the exterior surface of the inner platform of the SRV structure system, thereby enabling variable pitch of the SRV.

11. A swirl recovery vane (SRV) structure system comprising:
an inner platform; and
a plurality of open swirl recovery vanes arranged circumferentially around the inner platform and an axis, wherein each vane is connected to the inner platform and extends, radially relative to the axis, from a trunnion connected to an exterior surface of the inner platform to an unshrouded distal tip of the vane,
wherein at least one from among the plurality of vanes comprises a heat exchanger that comprises:
a gas inlet configured to couple a bleed air valve of a stage of a high or low compressor section of a gas generator to a gas channel;
the gas channel adapted to:
enable gas to flow in through the gas inlet as cool gas and out through a gas outlet as warm gas; and extend into a body of the vane to enable heat transfer from a heat source within the vane to the cool gas; and the gas outlet configured to output the warm gas from the gas channel to an ambient environment outside of the vane.

12. The SRV structure system of claim 11, wherein:
the bleed air valve of the compressor section is located within a low pressure compressor of the gas generator.

13. The SRV structure system of claim 11, wherein the gas outlet comprises at least one hole in an exterior surface of the vane.

14. The SRV structure system of claim 11, wherein the gas channel is located proximate to a center between opposing side exterior surfaces of the vane.

15. The SRV structure system of claim 11, wherein:
the at least one vane from among the plurality of vanes further comprises a fluid heat exchanger that comprises:
a fluid inlet;
a fluid outlet; and
a fluid channel adapted to enable hot fluid to flow between the fluid inlet and fluid outlet, wherein the fluid channel extends into the body of at least one vane; and
the heat source comprises the hot fluid.

16. The SRV of claim 15, wherein:
the fluid heat exchanger comprises a manifold that comprises the fluid inlet and that is configured to couple a fluid supply to the fluid channel such that the fluid supply is fluidly coupled to the fluid channel through the fluid inlet through the manifold; and
the trunnion comprises the manifold; and
the trunnion is configured to pivotally connect to the exterior surface of the inner platform of the SRV structure system.

17. The SRV of claim 15, wherein the fluid channel is located proximate to at least one from among opposing side exterior surfaces of the vane.

18. The SRV structure system of claim 15, wherein the fluid inlet is configured to couple the fluid channel to an oil pump associated with an oil supply circuit that receives oil from an oil tank.

19. The SRV structure system of claim 15, wherein the fluid outlet is configured to couple the fluid channel to an oil pump associated with an oil return circuit inputs oil to an oil tank.

20. The SRV structure system of claim 11, wherein the trunnion is configured to pivotally connect to the exterior surface of the inner platform of the SRV structure system, thereby enabling variable pitch of the vane.

* * * * *